United States Patent Office 3,449,245
Patented June 10, 1969

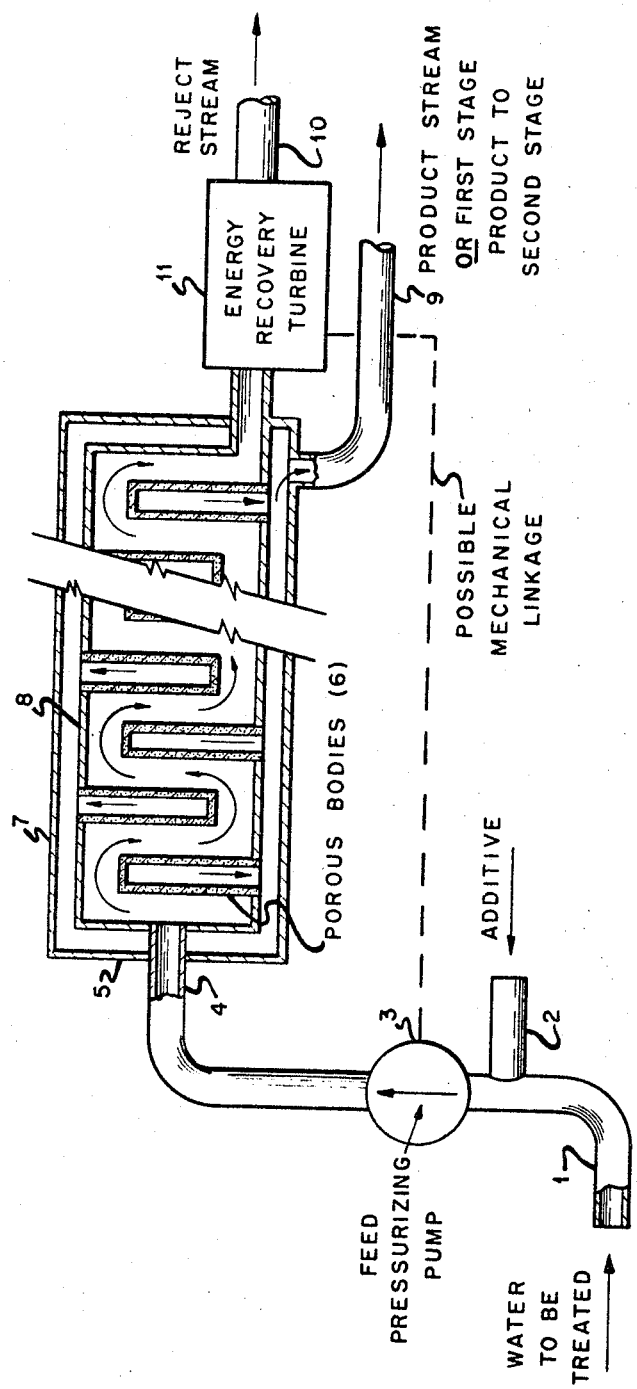

3,449,245
METHOD OF SEPARATING SALTS FROM AQUEOUS SOLUTIONS
James S. Johnson, Kurt A. Kraus, Arthur E. Marcinkowsky, Harold O. Phillips, and Arthur J. Shor, Oak Ridge, Tenn., assignors to the United States of America as represented by the United States Atomic Energy Commission
Filed Oct. 23, 1965, Ser. No. 504,277
Int. Cl. B01d *13/00*
U.S. Cl. 210—23          17 Claims

ABSTRACT OF THE DISCLOSURE

A method of reducing the concentration of metal salts in an aqueous solution comprising contacting a permeable substrate having pores with diameters in the range of 30 A. to 5 microns with a water-soluble material and forcing said aqueous solution past the resulting treated substrate under conditions whereby a portion of said solution passes through said substrate thereby becoming depleted in said metal salts.

---

The invention described herein was made in the course of, or under, a contract with the United States Atomic Energy Commission and in the course of work performed for the Office of Saline Water of the United States Department of the Interior.

Our invention relates to hyperfiltration, or reverse osmosis methods of reducing the concentration of low-molecular-weight solutes, commonly referred to as "crystalloids" in colloid chemical literature, in water by passing an aqueous solution through a permeable membrane under pressure.

Some permeable membranes of the type used in electrodialysis, comprising thin permeable sheets, can reject a solute from an aqueous solution forced through them under pressure. However, these membranes have several disadvantages. First, the rate of flow through these membranes is low. The flow rate through commercially available electrodialysis membranes under normal operation pressures for appreciable rejection is in the order of several hundredths of a gallon per square foot per day. Second, the process of preparing the membrane involves several steps including forming it by a process such as casting and then mounting it in place. The problems involved in the intricate job of preparing the membranes are magnified by the fact that the membranes are fragile and may easily be damaged.

Although the flow rate through cellulose acetate membranes under some conditions is reasonably high, this material has the disadvantages of difficulty of preparation and short life in use; in addition, for some applications much higher flow rates are desirable than can be achieved with a cellulose acetate membrane.

It is one object of our invention to provide an improved hyperfiltration method of separating water from dissolved salts.

It is another object of our invention to provide a hyperfiltration method of separating water from dissolved salts combining useful salt rejection with a high flow rate.

Other objects of our invention will be apparent from the following detailed description and the appended claims.

In accordance with our invention we have provided a method of separating an aqueous solution of metal salts into a first solution depleted in said metal salts and a second solution enriched in said metal salts comprising the steps of providing a permeable substrate having pores with diameters in the range of 30 A. to 5 microns, contacting said substrate with an aqueous phase containing a dispersible material, thereby forming a finely pored permeable membrane on said substrate, and forcing a portion of said aqueous solution through said permeable membrane under pressure.

The figure is presented for a better understanding of our invention and is a diagrammatic representation of a hyperfiltration system. In the figure water to be treated is introduced from conduit 1 together with additive from conduit 2 into a feed pressurizer pump 3. The pressurized feed is then passed through conduit 4 into the hyperfiltration vessel 5. This vessel contains porous bodies 6. The fluid passing through the pores in 6 collects in the zone defined by the outer shell 7 and inner shell 8 of vessel 5 and is then passed through conduit 9 as a product or, if desired, it may become a feed to a succeeding stage. The feed which does not pass through the porous bodies 6 is collected and sent out into conduit 10 through an energy recovery turbine 11. If desired, this could be sent to another stage. The turbine 11 may be connected to a stage of the feed pressurizer pump 3. The feed to pump 3 may be fresh feed, a product from a preceding stage, or a mixture of solutions from different sources.

The mechanism by which a salt-rejecting membrane is formed on the porous substrate is not known, and we do not wish to be bound by any theory; however, it is postulated that the dispersible material (additive) forms a thin layer along the leading surface of the permeable substrate, providing a dynamic membrane which rejects the solute in the feed. In some cases it will be noted that the mechanism is believed to be somewhat different.

A combination of a high flow rate and useful salt rejection is achieved using our process. The membrane is easily formed in place, and has a long life because it is selfhealing. The substrate can be used for a variety of processes by changing or modifying the membrane-forming additive. Additional control over properties of the membrane can be effected by the hydrodynamics of the system, i.e., by the rate of circulation and the degree of turbulence.

The term "useful salt rejection" connotes different rejection ability under different conditions. With brackish waters rejection will not need to be as high as with more concentrated feeds, such as sea water, in order to meet product quality requirements, e.g., U.S. Public Health Service standards. In addition, relatively low rejection, if accompanied by a very high permeation rate, may lead to lower over-all purification costs in multi-staged processes than a high rejection coupled with a low permeability in single-stage arrangements.

In carrying out our invention an aqueous phase containing a dispersible material is forced through a porous substrate. The substrate may be treated with the dispersible materal by contact therewith before its contact with the aqueous salt solution or it may be treated by maintaining a low concentration of the additive in the salt solution. Even when a separate step is used to pretreat the substrate with the additive, some additive may be provided in the salt solution, and this procedure is preferred since it provides a source of material to heal defects in the membrane which may develop during processing.

The permeable substrate may be of any material capable of maintaining its integrity under the pressures involved and in the presence of the water and its dissolved salts. The chemical nature of the substrate is not significant, and materials of such widely diverse natures as metal filters, porcelain frits, porous carbon, glass frits, and organic materials such as highly permeable cellophane may be used.

The diameter of the pores in the substrate may suitably range from about 30 A. to 5 microns. When the additive is a water-insoluble substance it is preferred that the pore diameter be about the order of the diameter of the additive particles. If the additive is water-soluble it is desirable to use a substrate with as large a pore size as can be used that will restrain permeation by the additive. The additives used in our invention unexpectedly do not pass through the pores of the substrate even though the molecular dimensions of these substances are small compared to the diameters of the pores in the substrate, and are thus able to form a salt-rejecting membrane on the substrate.

The configuration and thickness of the substrate may be varied widely to meet equipment requirements. An important advantage of being able to use a material having large pore diameters to separate solute from water is that a substrate thick enough to provide its own support against high pressures may be used without incurring too high a pressure drop across the substrate. While it is generally desirable to keep the substrate as thin as possible to minimize pressure drop, the substrate in our invention may be made thick enough to withstand a high pressure without a separate supporting structure and a relatively thick substrate may be preferred to the presence of supporting material for the substrate. A substrate thickness of several millimeters may be used for large-pore-sized substrates.

We have discovered that many different substances having a wide variety of physical and chemical properties will function as a salt-rejecting membrane when an aqueous phase containing them is forced through a porous substrate. The additive may be of a nature to form a true solution, an emulsion or a suspension in water; it may be an electrolyte or a neutral material; and it may be either an organic or an inorganic substance.

These additives may be more specifically characterized as falling into one of the following classes: neutral organic polymers, polyelectrolytes, organic ion exchangers, inorganic ion exchangers, and polyvalent metal salts.

As used in the disclosure and claims, the term "neutral organic polymer" refers to a high-molecular-weight compound whose hyperfiltration properties do not depend on the presence of ionizable groups. It does not preclude compounds which have a concentration of ion exchange groups too small to affect substantially the rejection properties or a low density of ion exchange groups introduced intentionally to increase solubility of a neutral material otherwise too insoluble to be useful.

The preferred neutral organic materials are high-molecular-weight polymers whose solubilities need not be high; solubilities of the order of 0.1 mg. per liter can be sufficient, though either somewhat higher or lower concentration may be desirable in various cases. The neutral polymers should be of such a chemical nature that the activity coefficients $\gamma_{\pm}^*$ of the solute to be eliminated should be high in low-water-fraction solutions containing organic material of similar chemical nature. Preferably, the value of $\gamma_{\pm}^*$, referred to infinite dilution of solute in pure water, and consistent with concentration of salt expressed in moles/kg. water, should be greater than 1 at a water content of less than 10%. Methods of determination of activity coefficients are well known; a procedure convenient in many cases is measurement of solubility of the solute of interest in model water-organic systems. Low solubilities indicate a favorable material. More details pertinent to these methods of testing organic-water systems for suitability in forming rejecting barriers may be found in the Journal of the American Chemical Society, 86, 2571 (1964), and in the Journal of Physical Chemistry, 69, 2697 (1965).

Typical of the useful neutral organic polymers are polyvinyl pyrrolidone, polyvinyl alcohol, hydroxyethyl cellulose, polyacryamide, and sucrose octoacetate.

Any high-molecular-weight organic polyelectrolyte may be used as an additive. Typical of the polyelectrolytes which may be used are polyvinylbenzyl trimethylammonium chloride, methyl vinyl ethermaleic anhydride copolymers, polysulfonates, and polycarboxylates.

Any organic ion exchanger, either cationic or anionic in form, may be used as an additive. These ion exchangers preferably have a low degree of cross-linking. For example, 0.5 percent cross-linking is suitable. The active groups of the ion exchangers may be strongly acidic, weakly acidic, strongly basic, or weakly basic. Typical functional groups are sulfonic acid, carboxylic acid, quaternary amines, and lower amines, respectively.

The water-soluble salts of the polyvalent metals capable of forming hydrous metal oxides have ion exchange properties and are useful as additives. Typical of these compounds are ferric, zirconium, thorium, copper, and lead salts. If a lead salt is used as an additive, the characteristic of lead of forming a strong complex with chloride precludes its use in a chloride system.

Water-insoluble inorganic compounds which are useful additives are clays as represented by bentonite.

We have discovered that some combinations of members of different classes of additives form a membrane having unexpectedly high salt rejection capabilities. The combinations we have found to be useful are the organic ion exchangers with either a polyelectrolyte having the same charge, or an uncharged polymer; a polyelectrolyte with an uncharged polymer; an inorganic ion exchanger with either a polyelectrolyte having the same charge, or an uncharged polymer; and a hydrolyzable metal with either a polyelectrolyte or an uncharged organic polymer. Membranes formed from these mixtures provide greater salt rejection than is predictable from the salt rejection capabilities of the additives considered individually.

The preferred pH of the aqueous phase is dependent upon the additive. For neutral additives and strongly basic or strongly acidic ion exchangers or polyelectrolytes, the pH does not have any significant effect on the flow rates or salt rejection. The pH is significant for the hydrolyzable additives and the pH used will depend upon the acidity of the ion under consideration. It is desirable to maintain the pH at a point at which the metal ion hydrolyzes but does not precipitate.

It is not to be expected that every additive will be suitable for processing every solution. In general, neutral organic polymers will be relatively insensitive to the ionic species in the feed. Ion exchange barriers, both organic and inorganic, and polyelectrolyte barriers normally reject salts containing polyvalent coions better than salts containing monovalent coions, but are sometimes deleteriously affected by presence of polyvalent counterions, a sensitivity frequently alleviated by the presence of a neutral additive. This may partially explain the superior characteristics of membranes formed from a mixture of classes of additives where one of the additives is neutral.

Using one or another embodiment of our invention the concentration of solute can be reduced regardless of its initial concentration. The types of solutions which may be treated include sea water, brackish water, and industrial water including radioactive waste solutions. It may be desirable to take into account the solute concentration as well as its composition in selecting the additive. The neutral additives have a substantially constant salt rejection value over a wide range of salt concentrations, while with the ion exchange materials the rejection is better at low salt concentrations, e.g., the concentration of salt in brackish waters. The degree of concentration change in a single pass through the barrier is influenced by factors such as the type of barrier used and the pressure used to force the liquid through the membrane.

The pressures required to carry out a separation process will vary with several factors, the primary ones being the composition of the solution and the nature of the membrane. The pressure must be greater than the difference in the osmotic pressure between the permeating and feed solutions. We have found that as the pressure is increased above this difference in osmotic pressure not only does the flow rate increase, but the salt rejection value also increases until it levels off or at high permeation rates the effective rejection value is adversely affected by concentration polarization. Circulation of the solution past the membrane at a rate high enough to maintain the concentration of salt at the membrane near the concentration of salt in the feed solution or use of turbulence promotion will decrease the concentration polarization and thus improve the salt rejection. In general, the pressure is limited only by equipment considerations, including the pressure the substrate is able to withstand.

A high pressure is desirable to increase the production rate so that energy costs can be balanced against capital costs to give the lowest cost per unit of product. The optimum pressure for a specific system will depend upon factors such as the nature of the system, the composition of the feed solution to be treated, and the energy costs. Even with a feed solution dilute enough for osmotic pressure differences to be trivial, pressures of at least 100 pounds per square inch are desirable and pressures as high as several thousand pounds per square inch may be needed to attain the lowest unit costs for the product.

Extremely low concentrations of the additive may be used; i.e., concentrations as low as 0.1 part per million are effective. The preferred concentration will depend upon conditions such as the specific additive used, pressure used to force the solution through the membrane, and the pore size of the substrate.

Having thus described our invention the following examples are offered to illustrate it in more detail.

EXAMPLE I

A permeable substrate was made by cutting disks 2 centimeters in diameter from a 40-micron-thick silver filter having a nominal pore size 0.2 micron in diameter and mounting the disk supported by a porous metal frit in a hyperfiltration apparatus. This disk was then treated by passing through it an aqueous solution 0.02 molar in NaCl and 0.002 molar in $ThCl_4$. A solution of the same composition was circulated past the membrane at a pressure of 2200 pounds per square inch. The transmission rate through the barrier was over 330 gallons per day per square foot (g.p.d./ft.$^2$) and the salt rejection was 90 percent. This demonstrates a high rejection coupled with a high permeation rate.

The procedure in this example was typical of the procedure of Example I–XIII. Example II illustrates a modification in which a substrate is pretreated with a solution different from that whose rejection is being investigated.

EXAMPLE II

A porous silver disk similar to that of Example I was conditioned by forcing through it a pretreating solution 0.02 molar in NaCl and 0.001 molar in $ThCl_4$ (pH 2–3).

The pressure used to force the liquid through the membrane ranged from 100 p.s.i. at the beginning to 500 p.s.i. at the end of the conditioning step. The permeation rate decreased from 15 cm./min. to 1 cm./min. during this pretreatment. A feed solution 0.025 molar in NaCl, 0.012 molar in $MgCl_2$, and 0.0001 molar in $ThCl_4$ was circulated past the conditioned membrane at a pressure of 400 p.s.i. The transmission rate through the membrane was 60 g.p.d./ft.$^2$, and the salt rejection was 68%, based on total chloride analysis; separate analyses gave for $MgCl_2$ a rejection of 82% and for NaCl, 55%.

Other experiments were carried out using other additives and other salts. The data for these experiments, together with the data for Experiments I and II, are given in Table I below.

TABLE I

[Substrate: Silver: 0.2 micron nominal pore diameter]

| Example Number | Feed Solution | | Pressure (p.s.i.) | Flow Rate (g.p.d./ft.$^2$) | Salt Rejection (Percent) |
|---|---|---|---|---|---|
| | Salt | Additive | | | |
| I | 0.02 M NaCl | 0.002 M $ThCl_4$ | 2,200 | 330 | 90 |
| II | 0.025 M NaCl-0.012 M $MgCl_2$ | 0.001 M $ThCl_4$ | 400 | 60 | 68 |
| III | 0.02 M NaCl | 0.002 M $ZrOCl_2$ | 2,100 | 320 | 85 |
| IV | 0.02 M NaCl | 0.002 M $FeCl_3$ | 2,200 | 180 | 30 |
| V | 0.03 M NaCl | 0.002 M $La(NO_3)_3$ [1] | 600 | 530 | 14 |
| VI | 0.02 M NaCl | 0.002 N polyelectrolyte [2] | 2,200 | 1,000 | 17 |
| VII | 0.02 M NaCl | do.[2] | 650 | 150 | 65 |
| VIII | 0.05 M NaCl | 0.01% polyelectrolyte [3] | 1,900 | 30 | 73 |
| IX | 0.05 M NaCl | 0.001% polyelectrolyte [3] | 1,900 | 65 | 55 |
| X | 0.025 M $MgCl_2$ | do.[3] | 1,950 | 50 | 12 |
| XI | 0.025 M $Na_2SO_4$ | do.[3] | 2,000 | 40 | 86 |
| XII | 0.05 M NaCl | 0.01 wt. percent polyvinyl pyrrolidone | 1,850 | 30 | 18 |
| XIII | 0.05 M NaCl | 0.0001 wt. percent polyvinyl alcohol | 2,000 | 80 | 17 |
| XIVa | 0.05 M NaCl | 0.001 wt. percent hydroxyethyl cellulose | 1,900 | 45 | 20 |
| XIVb | 0.05 M NaCl | 0.0001 wt. percent hydroxyethyl cellulose | 2,000 | 45 | 20 |
| XIVc | 0.02 M NaCl | 0.001 wt. percent hydroxyethyl cellulose | 1,200 | 30 | 22 |
| XV | 0.02 M NaCl | Bentonite [4] | 1,850 | 180 | 35 |
| XVI [5] | 0.02 M NaCl | do.[4] | 1,700 | 120 | 40 |
| XVII [5] | 0.02 M NaCl | Cation exchange resin [6] | 1,600 | 180 | 45 |

[1] The pH of this solution was adjusted to 7.5.
[2] Polyvinylbenzyl trimethyl ammonium chloride.
[3] Methyl vinyl ether-maleic anhydride copolymer which hydrolyzes in water to produce carboxylic acid groups.
[4] The NaCl solution was shaken with bentonite and then permitted to settle for 3 hours.
[5] The frit was a 1.2-micron silver frit.
[6] Dowex-50 0.5% cross-linked.

Examples I–V demonstrate the use of hydrolyzable polyvalent ions in the preparation of salt-rejecting membranes from porous bodies.

Except for Example V, where the pH of the additive was first adjusted, the experiments were carried out at the natural pH of the additive-water mixture. The pH of the additive was, however, adjusted in a number of other cases. Thus, with Th(IV), experiments were carried out in the presence of 0.02 molar HCl and after addition of one and two moles of NaOH per mole of Th(IV). Acidification tended to decrease rejection of NaCl. Addition of base in this case did not seriously affect rejection but had the advantage of permitting establishment of the salt-rejecting layer rapidly with substrates of larger pore diameter (1.2 microns compared with 0.2 micron). In these examples the additive was still in solution; precipitation of a hydrous oxide and its deposition on a porous substrate, however, should also lead to high flux rejection membranes. As far as the rejection with these materials is determined by their ion exchange characteristics, it should be recognized that variation of pH is not always beneficial since ion exchange characteristics vary with pH [for details see "Ion Exchange Properties of Hydrous Oxides," K. A. Kraus, H. O. Phillips, T. A. Carlson, and J. S. Johnson, Proceedings of Second United Nations International Conference on the Peaceful Uses of Atomic Energy, 28, 3–16 (1958)].

Examples VI–XI demonstrate the use of soluble polyelectrolytes for this purpose. An anionic polyelectrolyte is used in Examples VI and VIII and a cationic polyelectrolyte in Examples VIII–XII. Examples VI and VII were performed in succession; they are remarkable in that they show significant rejection even at a transmission rate of 1000 g.p.d./ft.$^2$ (Example VI) with increasing rejection at lower transmission rate (Example VII). This behavior is characteristic for a case of higher concentration polarization at the higher flow rate and suggests that with hydrodynamically more properly designed cells good rejection is feasible in the production range of 1000 g.p.d./ft.$^2$.

Examples XII–XIV demonstrate use of uncharged organic polymeric substances. Examples XIVa–c show that, with this type of additive, rejection is not very dependent on feed concentration. Examples XV–XVII demonstrate the use of insoluble ion exchange materials; an inorganic clay-type material is used in Examples XV and XVI and a typical organic ion exchange resin in Example XVII.

In all of the examples of Table I the substrate has been for experimental convenience a porous silver frit. Examples XVIII–XXIV below are offered to show that the chemical nature of the substrate is not a variable of primary importance.

EXAMPLE XVIII

A porcelain disk 2 cm. in dameter and 1.5 mm. thick, havng a nominal pore size of 0.5-micron diameter was treated by passing a 0.0075 molar NaCl-0.012 molar ThCl$_4$ solution through it. A solution 0.0186 molar in NaCl and 0.0001 molar in ThCl$_4$ was circulated past the resulting disk at a pressure of 350 p.s.i. The flow rate through the barrier was 100 g.p.d./ft.$^2$ and the salt rejection was 76%.

Experimental runs were made with a variety of substrate materials. The data from these runs, together with the data from Example XVIII, are given as Examples XIX–XXIV in Table II below.

The salt rejection was 41% and the transmission rate was 55 g.p.d./ft.$^2$.

A solution 0.07 molar in NaCl and containing no resin was passed over the same barrier at a pressure of 1400 p.s.i. The salt rejection was 35% and the flow rate 80 g.p.d./ft.$^2$. The examples illustrate that, after rejecting membranes are formed, the additive need not continuously be present to retain salt-rejecting properties.

The following examples are offered to show the superior results achieved by using a combination of additives.

EXAMPLE XXVII

A 1.2-micron silver frit was conditioned with ion exchange beads in the same manner as in Example XXV by changing the beads from the perchlorate form to the chloride when in place on the substrate. However, as a result of defects in the operation the treated frit had virtually no rejection ability, although the permeation rate indicated that most of its pores were plugged. When 1 milligram per liter of hydroxyethyl cellulose was added to a 0.02-molar NaCl feed, the rejection rose to 70% at a transmission rate of 90 g.p.d./ft.$^2$ at 1500 p.s.i. This particular neutral additive with similar frits unimpregnated with resins normally gives a rejection of about 20%.

The following example shows results attained with a combination of thorium salts and a polyelectrolyte.

EXAMPLE XXVIII

A solution of 0.02 molar in NaCl, 0.002 molar in TaCl$_4$ and 0.002 normal in polyvinylbenzyl trimethyl

TABLE II

| Example Number | Feed Solution | | Pressure (p.s.i.) | Substrate | | Flow Rate (g.p.d./ft.$^2$) | Salt Rejection (Percent) |
|---|---|---|---|---|---|---|---|
| | Salt | Additive | | Material | Nominal Pore Diameter (Micron) | | |
| XIX | 0.0186 M NaCl | 0.0001 M ThCl$_4$ | 350 | Porcelain | 0.5 | 100 | 75 |
| XX | 0.034 M NaCl | 0.001 M ThCl$_4$ | 600 | 1.5 mm.-thick carbon | 0.3 | 200 | 22 |
| XXII | 0.024 M Na$_2$SO$_4$ | 0.001 N polystyrene sulfonic acid | 600 | do | 0.3 | 90 | 46 |
| XXIII | 0.034 M NaCl | 0.001 M ThCl$_4$ | 500 | Sintered glass | 0.9–1.4 | 150 | 45 |
| XXIV | 0.025 M NaCl | 1 wt. percent polyvinyl pyrrolidone | 3,000 | Cellophane [1] | | 7 | 50 |

[1] Schleicher and Schuell 02 cellophane with nominal pore size 0.25 micron.

The following example illustrates one method of making a membrane on a porous substrate with an organic ion exchanger.

EXAMPLE XXV

An insoluble anion exchange resin of the Dowex-1 type of low cross-linking (0.5 percent divinyl benzene) was ground and slurried in a 0.1-molar NaClO$_4$ solution. The resulting slurry was transferred to a hyperfiltration apparatus containing a 1.2-micron nominal pore diameter silver frit. After two hours under pressure the transmission rate was 3540 g.p.d./ft.$^2$ at 1500 p.s.i. A 0.02-molar NaCl solution containing the same resin was then circulated past the membrane. At 2000 p.s.i. the transmission rate was 45 g.p.d./ft.$^2$ and the salt rejection was 70%.

As can be seen from this example the transmission rate through the membrane drops drastically in changing from the perchlorate to the chloride form of the resin. This is because the chloride form of the resin has a larger volume than the perchlorate form. This has a beneficial effect of filling the pores better by expanding the resin in the pores, thus making the membrane more effective in rejecting salt. Other methods of modifying the volume of ion exchange resins are well known in the art and may be used in this technique of making membranes.

EXAMPLE XXVI

The procedure of Example XXV was followed in conditioning a silver frit with nominal pore size of 1.2 microns. A 0.02-molar NaCl solution containing suspended resin rejected 37% NaCl at a transmission rate of 65 g.p.d./ft.$^2$ at a pressure of 1500 p.s.i.

A solution 0.02 molar in NaCl and containing no resin was circulated at a pressure of 1400 p.s.i over this barrier.

ammonium chloride was circulated past a 0.2-micron silver frit at a pressure of 1000 p.s.i. The salt rejection was 80% and the permeation rate was 250 g.p.d./ft.$^2$.

Other runs similar to those of Example XXVIII were made with a mixture of $2 \times 10^{-4}$ molar ThCl$_4$ and 0.1% polyvinyl pyrrolidone. The data from these runs are given as Examples XXIX to XXXII in Table III below.

TABLE III

Substrate: Silver: 0.2 micron nominal pore diameter
Additives: $2 \times 10^{-4}$ M ThCl$_4$ + 0.1% polyvinyl pyrrolidone

| Example Number | Feed Solution | | Pressure (p.s.i.) | Flow Rate (g.p.d./ft.$^2$) | Salt Rejection (percent) |
|---|---|---|---|---|---|
| | Salt | Molarity | | | |
| XXIX | NaCl | 0.1 | 2,000 | 45 | 92 |
| XXX | NaCl | 0.5 | 1,900 | 15 | [1] 40 |
| XXXI | NaCl | 0.5 | 1,800 | 4.5 | 54 |
| XXXII | Na$_2$SO$_4$ | 0.02 | 1,600 | 15 | 55 |

[1] The circulation rate in this example was only 10% of the circulation rate in the other examples.

Example XXXII illustrates that presence of a neutral additive alleviates the deleterious effects sometimes encountered with an ion exchange rejecting layer when polyvalent counterions (here sulfate) are present in the feed.

We have found that the addition of hydrolyzable ions to feed solution greatly enhances the normally low rejection ability of cellophane. In the following examples the cellophane used was 0.001-inch-thick Visking dialysis tubing (wet thickness 45 microns), a material of relatively low permeability. At 2500 p.s.i. this material rejects about 10% of the salts from a 0.1-molar NaCl solution with a permeation rate of 12 g.p.d./ft.$^2$.

EXAMPLE XXXIII

The 0.001-inch-thick cellophane described immediately above was treated with a 0.02-molar $CuCl_2$ solution for a period of one day. A solution 0.06 molar in NaCl was then circulated past the membrane at a pressure of 2500 p.s.i. The salt rejection was 75% and the permeation rate was 5 g.p.d./ft.$^2$.

It can be seen that the addition of a hydrolyzable ion greatly increases the salt rejection of cellophane. The mechanism in this case is believed to involve impregnation of the complete thickness of the cellophane with the additive in question, rather than simply the leading edge.

Cellophane was treated with other solutions and the data for these runs, together with the data of Example XXXIII are given in Table IV below. In these examples the cellophane was pretreated with the additives and the salt solution did not contain the additives.

Some hyperfiltration properties of this porous glass for salt solutions with additives are summarized in Table V below.

TABLE V

[Substrate thickness: 1 millimeter]

| Example Number | Solute | Conc. (Moles/l.) | Other Solutes | Pressure (p.s.i.) | Permeation (g.p.d./ft.$^2$) | Rejection (Percent) |
|---|---|---|---|---|---|---|
| LII | NaCl | 0.03 | (a) | 1,800 | 6 | 35 |
| LIII | NaCl | 0.01 | (b) | 1,200 | 4 | 34 |
| LIV | NaCl | 0.01 | (c) | 1,500 | 5 | 55 |
| LV | $Na_2SO_4$ | 0.005 | (d) | 1,500 | 2.5 | 70 |
| LVI | NaCl | 0.03 | 0.05 M $ThCl_4$ | 600 | 8 | 63 |
| LVII | NaCl | 0.03 | 0.001 M $ThCl_4$ | 600 | 8 | 55 |
| LVIII | NaCl | 0.01 | 0.001 M $ThCl_4$ | 600 | 8 | 31 |
| LIX | $MgCl_2$ or $CaCl_2$ | 0.02–0.03 | 0.001 M $ThCl_4$ | 600 | 12 | 40–50 | a .002 M $NaCO_3$, .002 M $NaSiO_3$, .005 M $H_2SiO_3$; pH ~10.
b .001 M $NaHCO_3$, pH ~9.4.
c .001 M $Na_2CO_3$, pH ~10.2.
d Same additions as a, but rejection based on $^{24}Na$. In the presence of other mixed solutes, based on chloride titrations.

We believe the mechanism by which the additives work in this case is by building up the charge density on the pore walls, a process which should increase rejection [see L. Dresner and K. A. Kraus, J. Physical Chemistry 67, 990 (1963)], rather than by forming a layer on the leading edge. Raising the pH should raise the negative charge along the pores, i.e., increase the cation exchange capacity, while adsorption of Th(IV) is presumed to change the fixed charge to positive, i.e., make the glass an anion exchanger. Silicate in the basic additives serves to check the enlargement of the pores by dissolution of the glass, as well as helping to control the pH.

The permeabilities, while modest, are high considering the membrane thicknesses involved, and thin layers, pre-

TABLE IV

Substrate: 0.001-inch-thick cellophane of low permeability
Pressure: 2,500 p.s.i.

| Example Number | Additive or Pretreating Solution | Feed Solution Salt | Flow Rate (g.p.d./ft.$^2$) | Salt Rejection (Percent) |
|---|---|---|---|---|
| XXXIII | 0.02 M $CuCl_2$ | 0.06 M NaCl | 5 | 75 |
| XXXIV | | 0.1 M NaCl [1] | 4 | 50 |
| XXXV | | 0.01 M NaCl [1] | 4 | 68 |
| XXXVI | | 0.5 M NaCl [1] | 4 | 32 |
| XXXVII | | 0.1 M NaCl [1] | 4 | 42 |
| XXXVIII [2] | 0.03 M $FeCl_3$ | | 2 | 80 |
| XXXIX [2] | | 0.1 M NaCl | 2 | 85 |
| XL [2] | 0.0005 M $FeCl_3$ | 0.5 M NaCl | 3 | 64 |
| XLI [2] | 0.0001 M $FeCl_3$ | 0.1 M NaCl | 3 | 62 |
| XLII [2] | 0.00001 M $FeCl_3$ | 0.01 M NaCl | 3 | 80 |
| XLIII [2] | 0.05 M $ZrOCl_2$ | | 5 | 62 |
| XLIV [2] | | 0.1 M NaCl | 8 | 27 |
| XLV [2] | 0.4 M $Pb(OH)_{0.9}(ClO_4)_{1.1}$ | | 2.5 | 99 |
| XLVI [2] | | 0.1 M $NaClO_4$ | 3.5 | 75 |
| XLVII [2] | 0.0001 M $ThCl_4$ | 0.05 M NaCl | 5 | 61 |
| XLVIII | 0.001 M $ThCl_4$ | 0.5 M NaCl | 4 | 42 |
| XLIX | 0.0001 M $ThCl_4$ | 0.025 M $MgCl_2$ | 4 | 96 |
| L | 0.0001 M $ThCl_4$ | 0.25 M $Na_2SO_4$ | 2 | 82 |
| LI | | Sea Water | 2 | [3] 40 |

[1] These experiments carried out successively on same membrane as in Example XXXIII over a period of four days. The drop in salt rejection between XXXIV and XXXVII presumably indicates a slow washing of Cu(II) from the membrane.
[2] These examples fall in groups of XXXVIII–XLII, XLIII–XLIV, XLV–XLVI, and XLVII–LI. Experiments in each group were carried out on the same membranes, but a fresh sample of cellophane was used for each group. With Pb(II) (Examples XLV–XLVI), chloride ions cause rapid deterioration.
[3] Based on chloride. If based on total normality, 43%.

With these relatively impermeable membranes the transmission rate is largely determined by the resistance of the substrate to flow of solution. Since this resistance is proportional to the thickness of the membrane very much higher transmission rates than recorded in Table IV will be achievable with thinner starting materials.

Suitable additives have been found also to affect strongly the hyperfiltration properties of glasses with fine pores of uniform size. The material used in this example was a leached but unfired Vycor glass. The peak of the pore size distribution was 53 A., and 95% of the pore volume was associated with pore diameters of from 36 A. to 56 A. From the stock supplied by the manufacturer, the Corning Glass Company, disks of 0.5–1 mm. thickness were cut for our hyperfiltration cells, and baked for several hours at 550° C. or treated with boiling concentrated $NHO_3$ to remove organic matter. The rejection of the material so prepared is 5–12% for 0.03–M NaCl feeds and for 0.015–M $Na_2SO_4$, 20% (3 g.p.d./ft.$^2$ at 800 p.s.i.).

pared for example as a glaze on a porous backing, followed by leaching to form pores, should have quite useful fluxes.

The foregoing examples are intended to illustrate, not to limit, our invention. It is obvious that changes may be made in the material and configuration of the substrate; in the additive or combination of additives; in the concentration of additive; and in the composition of the aqueous solution without departing from our invention.

We claim:

1. A method of separating an aqueous solution of metal salts into a first portion depleted in said salts and a second portion enriched in said salts comprising the steps of providing a permeable substrate having pores with diameters in the range of 30 A. to 5 microns, said permeable substrate in an untreated state being incapable of rejecting metal salts, treating said substrate by forcing through it an aqueous phase containing a water-soluble material selected from the group consisting of neutral organic polymers, polyvalent metal salts, and high-molecular-weight polyelectrolytes, to form a finely pored permeable salt-rejecting membrane on said substrate, and passing said aqueous solution over the resulting substrate at a pressure and flow velocity sufficient to force a first portion of said solution through the pores in said substrate and a second portion of said solution parallel to the face of said substrate, said first portion thereby becoming depleted in metal salts and said second portion becoming enriched in metal salts.

2. The method of claim 1 wherein the neutral organic polymer is polyvinyl pyrrolidone.

3. The method of claim 1 wherein said water-soluble material is a mixture of at least one component selected from a first group of classes consisting of polyelectrolytes, and water-soluble polyvalent metal salts, and at least one component from a different class selected from a second group consisting of polyelectrolytes and neutral organic polymers.

4. The method of claim 1 wherein said water-soluble material is a mixture of a polyelectrolyte and a neutral organic polymer.

5. The method of claim 1 wherein said water-soluble material is a mixture of a water-soluble polyvalent metal salt and a member selected from the group consisting of polyelectrolytes and neutral organic polymers.

6. The method of claim 1 wherein said water-soluble material is a high-molecular-weight organic polyelectrolyte.

7. The method of claim 6 wherein said polyelectrolyte is selected from the group consisting of polysulfonates, polyamines, and polycarboxylates.

8. The method of claim 1 wherein said water-soluble material is a water-soluble salt of a polyvalent metal capable of forming a hydrous metal oxide.

9. The method of claim 8 wherein said polyvalent metal is selected from the group consisting of iron, zirconium, and thorium.

10. A method of making a dynamic permeable salt-rejecting membrane comprising providing a permeable substrate having pores with diameters in the range of 30 A. to 5 microns, said permeable substrate in an untreated state being incapable of rejecting metal salts, and forcing an aqueous phase containing a water-soluble material selected from the group consisting of neutral organic polymers, ion exchange materials, polyvalent metal salts, and high-molecular-weight organic polyelectrolytes through said substrate to form a finely pored permeable salt rejecting membrane on said substrate.

11. The method of claim 10 wherein the neutral organic polymer is polyvinyl pyrrolidone.

12. The method of claim 10 wherein said polyelectrolyte is selected from the group consisting of polysulfonates, polyamines, and polycarboxylates.

13. The method of claim 10 wherein said water-soluble material is a mixture of at least one component selected from a first group of classes consisting of polyelectrolytes and water-soluble polyvalent metal salts, and at least one component from a different class selected from a second group consisting of polyelectrolytes and neutral organic polymers.

14. The method of claim 10 wherein said water-soluble material is a mixture of a polyelectrolyte and a neutral organic polymer.

15. The method of claim 10 wherein said water-soluble material is a mixture of a water-soluble polyvalent metal salt and a member selected from the group consisting of polyelectrolytes and neutral organic polymers.

16. The method of claim 10 wherein said water-soluble material is a water-soluble salt of a polyvalent metal capable of forming a hydrous metal oxide.

17. The method of claim 16 wherein said polyvalent metal is selected from the group consisting of iron, zirconium, and thorium.

References Cited

UNITED STATES PATENTS

| | | | |
|---|---|---|---|
| 3,373,056 | 3/1968 | Martin | 210—23 X |
| 3,170,867 | 2/1965 | Loeb et al. | 210—500 X |
| 3,310,488 | 3/1967 | Loeb et al. | 210—22 |
| 3,367,787 | 2/1968 | Thijssen et al. | 210—22 X |
| 760,364 | 5/1904 | Woolworth | 210—502 X |
| 2,958,656 | 11/1960 | Stuckey | 210—500 X |
| 2,960,462 | 11/1960 | Lee et al. | 210—321 X |
| 3,022,187 | 2/1962 | Eyraud et al. | 55—158 X |
| 3,062,737 | 11/1962 | Azorlosa et al. | 210—22 |
| 3,132,094 | 5/1964 | McKelvey, et al. | 210—23 |
| 3,276,598 | 10/1966 | Michaels et al. | 210—500 |
| 3,331,772 | 7/1967 | Brownscombe et al. | 210—23 |
| 3,332,737 | 7/1967 | Kraus | 210—24 X |

REUBEN FRIEDMAN, *Primary Examiner.*

FRANK A. SPEAR, JR., *Assistant Examiner.*

U.S. Cl. X.R.

210—24, 321, 500, 502, 503